United States Patent [19]
Billings et al.

[11] Patent Number: 5,867,694
[45] Date of Patent: Feb. 2, 1999

[54] INFORMATION HANDLING SYSTEM INCLUDING APPARATUS AND METHOD FOR CONTROLLING CLOCK SIGNALS OPERATING AT DIFFERENT FREQUENCIES

[75] Inventors: Richard Vincent Billings, Plano; Tafal Kamel Jaber, Austin; George McNell Lattimore, Austin; Robert James Reese, Austin, all of Tex.

[73] Assignee: International Business Machines Corporation, Armonk, N.Y.

[21] Appl. No.: 723,439

[22] Filed: Oct. 7, 1996

[51] Int. Cl.⁶ ........................................... G06F 1/06
[52] U.S. Cl. ................................................. 395/556
[58] Field of Search ................................. 395/556

[56] References Cited

U.S. PATENT DOCUMENTS

| | | | |
|---|---|---|---|
| 4,845,437 | 7/1989 | Mansor et al. | 328/15 |
| 5,432,468 | 7/1995 | Moriyama et al. | 327/152 |
| 5,564,027 | 10/1996 | Bui et al. | 395/309 |
| 5,588,004 | 12/1996 | Suzuki et al. | 370/516 |
| 5,600,824 | 2/1997 | Williams et al. | 395/551 |

*Primary Examiner*—Thomas M. Heckler
*Attorney, Agent, or Firm*—Kelly K. Kordzik; Winstead Sechrest & Minick P.C.; Anthony V. S. England

[57] ABSTRACT

An information handling system, having a programmable clocking system for clocking data in and out of a processor, includes a processor, having one or more buses connected thereto, wherein a processor clock, and a clock for each of the buses connected to the processor, may be operating at different clock rates relative to each other, the programmable clocking circuit for generating bus clock signals with predetermined cycle skew eliminates the need to distribute separate clock signals across the processor chip. The clock generation circuit uses signals available on the processor integrated circuit for functional operation and tests. Further, flush and hold signals control predetermined latches in the clock generator circuit.

9 Claims, 11 Drawing Sheets

INFORMATION HANDLING SYSTEM INCLUDING APPARATUS AND METHOD FOR CONTROLLING CLOCK SIGNALS OPERATING AT DIFFERENT FREQUENCIES

BACKGROUND OF THE INVENTION

Technical Field of the Invention

The present invention relates to information handling systems and, more particularly, to information handling systems having means for controlling a number of clocks operating at different frequencies.

In modern, very large scale integrated (VLSI) circuit processors, the control of timing of data sampling becomes very complex. In some systems, a processor clock might be operating at a first frequency, a first bus clock may be operating at a second frequency, which may have an integer or fractional frequency relationship to the processor clock, and a third bus may be operating at a third frequency which may have a different integer or fractional frequency relationship to the processor clock.

The problem is compounded by the fact that a particular processor integrated circuit may be used in many different information handling systems where it must interface to other data support systems which may be running at different clock speeds. A second problem relates to the first. This is that data arrival time at a processor input may vary depending on the system clock rate of the processor.

Consider, for example, a prior art system having a clock timing as illustrated in FIG. 1.

For a given processor clock rate, the time during which data input to the processor may be valid could vary greatly depending upon a number of delay factors in the system. For example, in the Prior Art example of FIG. 1, a maximum permissible delay could cause the data valid window to begin after the rise of a second cycle of the processor clock and end sometime after the rise of a third cycle of the processor clock. The data sampling must occur within this data valid window based on the maximum possible delay in the system.

The system must also accommodate the permissible minimum delay in the system data path which could result in a data valid window beginning during a first half cycle of the first cycle of the processor clock and ending during the first half cycle of a second cycle of the processor clock.

As can be seen from FIG. 1, in this set of circumstances, in order for a data sampling point to be within the data valid window for maximum delay as well as the data valid window for minimum delay, the sampling point must occur approximately at the quarter cycle point in the second cycle of the processor clock. At that time, the data valid window under maximum delay and the data valid window under minimum delay would have a portion of the windows overlapping each other.

An attempt to sample data at the rise or fall of the processor clock in either maximum data delay or minimum data delay, does not capture valid data for both maximum and minimum delay situations.

The data sampling problem described above is complicated by systems in which one or more buses operating in conjunction with a processor are operating at integer or fractional clock speed ratios with respect to the processor clock speed. For example, a fractional clock speed ratio of 3:2 or 5:2 between the processor clock and a bus clock results in clocking which varies between processor and buses from cycle to cycle. For example, with a 3:2 clock speed ratio as between the processor clock and the bus clock, if the processor clock is running at 200 megahertz, the bus clock would be running at 133 megahertz, meaning that a five nanosecond cycle time for the processor clock would have to be coordinated with a 7.5 nanosecond bus clock. This results in rising edges of the processor clock and the bus clock being coincident once every three cycles.

An additional system complication may occur as a result of simultaneous switching of clocks. If, for example, two bus clocks, are operating at different ratios with respect to a processor clock, switch at the same time, an unusually high load will occur on the power supply perhaps causing power supply voltage drop.

SUMMARY OF THE INVENTION

Accordingly, an information handling system, having a programmable clocking system for clocking data in and out of a processor, includes a processor, having one or more buses connected thereto, wherein a processor clock, and a clock for each of the buses connected to the processor, may be operating at different clock rates relative to each other, a memory system, an input/output subsystem and user interface peripheral devices. The programmable clocking system generates data sampling signals for use by the processor, such that bus clock signals are not required to be propagated on the processor integrated circuit.

It is an advantage of the present invention that only one precisely controlled clock signal needs to be distributed on the processor integrated circuit.

DETAILED DESCRIPTION OF A PREFERRED EMBODIMENT OF THE INVENTION

Figure 1:
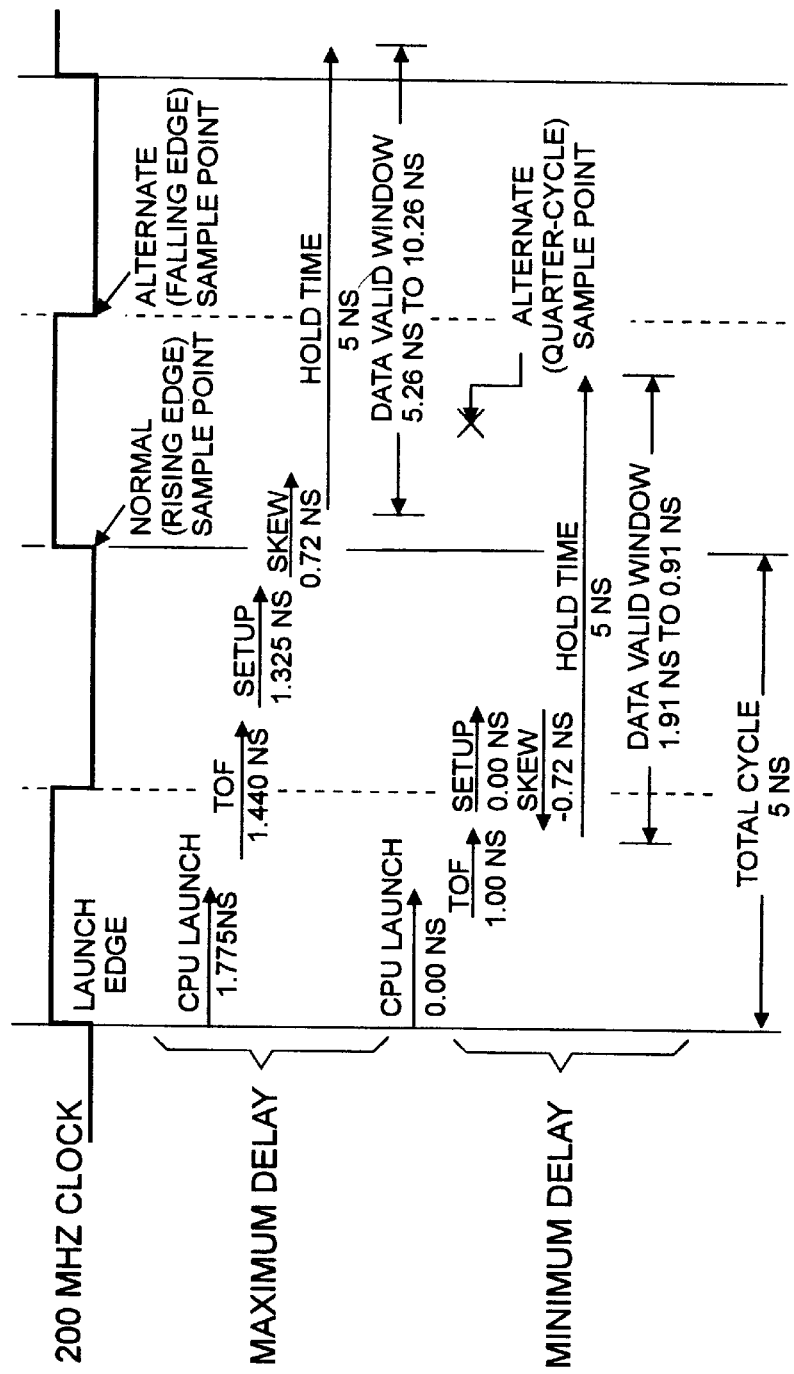
FIG. 1 is a timing diagram of a prior art clocking system showing the effects of variable delay on data sampling.
Figure 2:
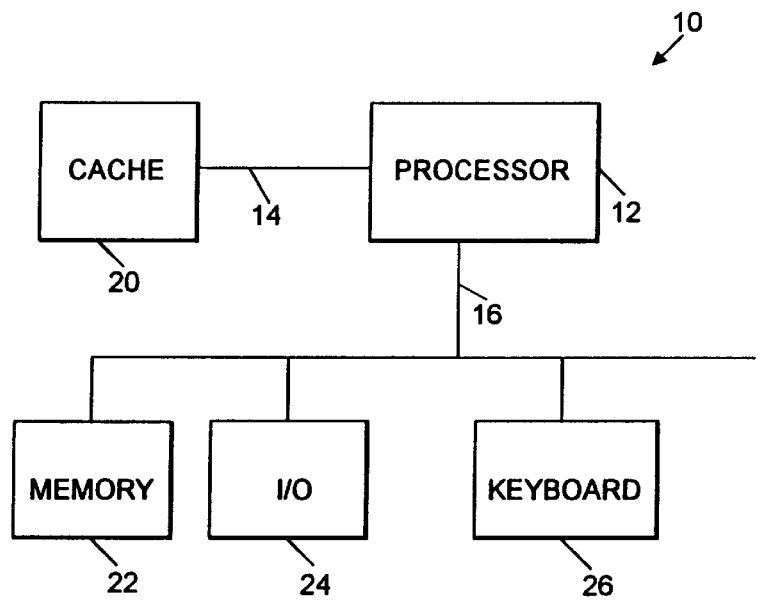
FIG. 2 is a block diagram of an information handling system incorporating the present invention.

Referring now to FIG. 2, an information handling system incorporating the present invention will be described. Information handling system 10 includes a processor 12 having a first bus 14 connecting the processor to a cache memory 20 and a second bus 16, the system bus, connecting the processor to memory 22, I/O subsystem 24 and keyboard 26.

In most information handling systems, the processor clock runs at a higher frequency than the cache bus clock or the system bus clock.

Generally, the clock speed ratio between the processor clock and either the cache bus clock or the system bus clock is some integer or fractional multiple between a ratio of 1:1 where the clocks are running at the same rate, to, for example, 4:1, where the processor clock is running at 4 times the speed of one of the bus clocks.

Table 1 below shows a range of potential clock speed ratios as between the processor clock speed and a bus clock speed.

TABLE 1

| Clock Speed Ratio | Bus Clk @ 200 Mhz Proc Clk | Bus Clk @ 225 Mhz Proc Clk | Bus Clk @ 250 Mhz Proc Clk | Allowable Cache Bus Clock Ratios |
|---|---|---|---|---|
| 1:1 | 200 MHz | 225 MHz | 250 MHz | 1:1, 3:2, 2:1 |
| 3:2 | 133 MHz | 150 MHz | 166 MHz | 1:1, 3:2, 2:1, 3:1 |
| 2:1 | 100 MHz | 112 MHz | 125 MHz | 1:1, 3:2, 2:1, 3:1 |
| 5:2 | 80 MHz | 90 MHz | 100 MHz | 1:1, 3:2, 2:1, 3:1 |
| 3:1 | 66 MHz | 75 MHz | 83 MHz | 1:1, 3:2, 2:1, 3:1 |
| 4:1 | 50 MHZ | 56 MHz | 62.5 MHz | |

Figure 3:
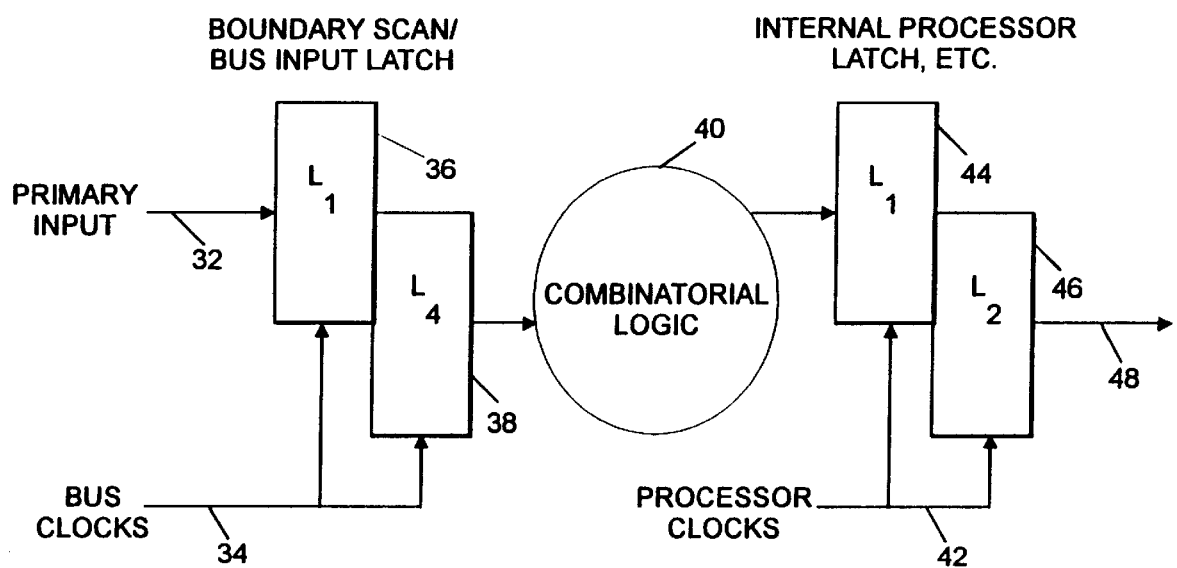
FIG. 3 is a block diagram of input and internal latches with separate clocking, according to the present invention.

Referring now to FIG. 3, input latches and internal processor latches employed in information handling system 10 will be described. Data inputs appear on primary input 32 to bus input latches 36 and 38 which are clocked by bus clocks 34. The output of latch 38 is connected to some combinatorial logic 40, which provides data signals to internal processor latches 44 and 46. The internal processor latches 44 and 46 are clocked by processor clock 42. The output of latch 46 appears on line 48.

With separate clock rates to input latch 36 from bus clock 34, and internal processor latches 44 and 46 from processor clock 42, several potential problems exist.

Figure 4:
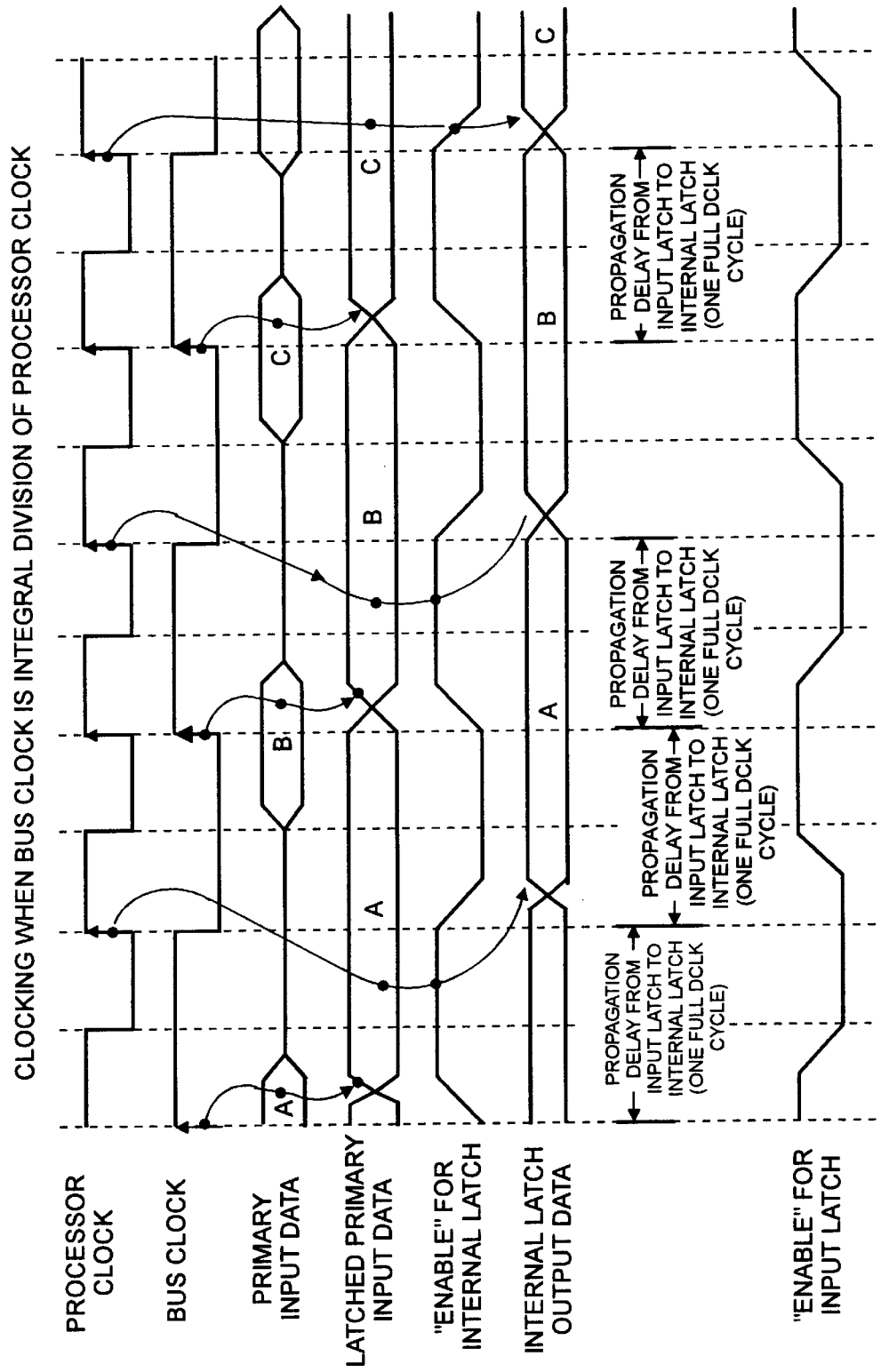
FIG. 4 is a timing diagram of the latch circuits of FIG. 3 where the bus clock rate is an integral submultiple of the processor clock rate.

The timing chart of FIG. 4 illustrates the problems which occur when the bus clock on line 34 is an integral submultiple of the processor clock on line 42. In such case, the bus clock 34 and processor clock 32 are synchronized such that the rising (latching) edge of bus clock 34 and processor clock 42 are coincident. With this, an enable input to internal latch 44 can be used to load the internal latch 44 one processor clock cycle after input latch 36 is loaded, avoiding an entire processor clock cycle for propagation through combinatorial logic 40 between latches 38 and 44.

Alternately, using an input latch enable signal, input latches 36 and 38 may be clocked with the same processor clock 42 as are internal latches 44 and 46. This eliminates distribution of a separate bus clock 34 on the processor chip.

The clocking may be complicated by fractional clock speed ratios, such as 3:2 or 5:2, between the processor clock and the bus clocks. In such case, for every other bus clock cycle, the critical rising edge of the bus clock is coincident with the rising edge of the processor clock, as with the integer clock ratio situation described with respect to FIGS. 3 and 4. For the other bus clock cycle, the critical rising edge is coincident with the falling edge of the processor clock cycle.

Fractional clock ratios have, in the prior art, required that dual clock signals be supported on the processor chip, that is, the normal processor clock along with any of its different phases and at least one bus clock. If the dual clocking is supported on the processor chip, both clock signals must be distributed across the chip. The bus clock must be distributed to all boundary I/O registers.

By contrast, the present invention does not require the distribution of two separate clock signals on the processor integrated circuit.

Figure 5:
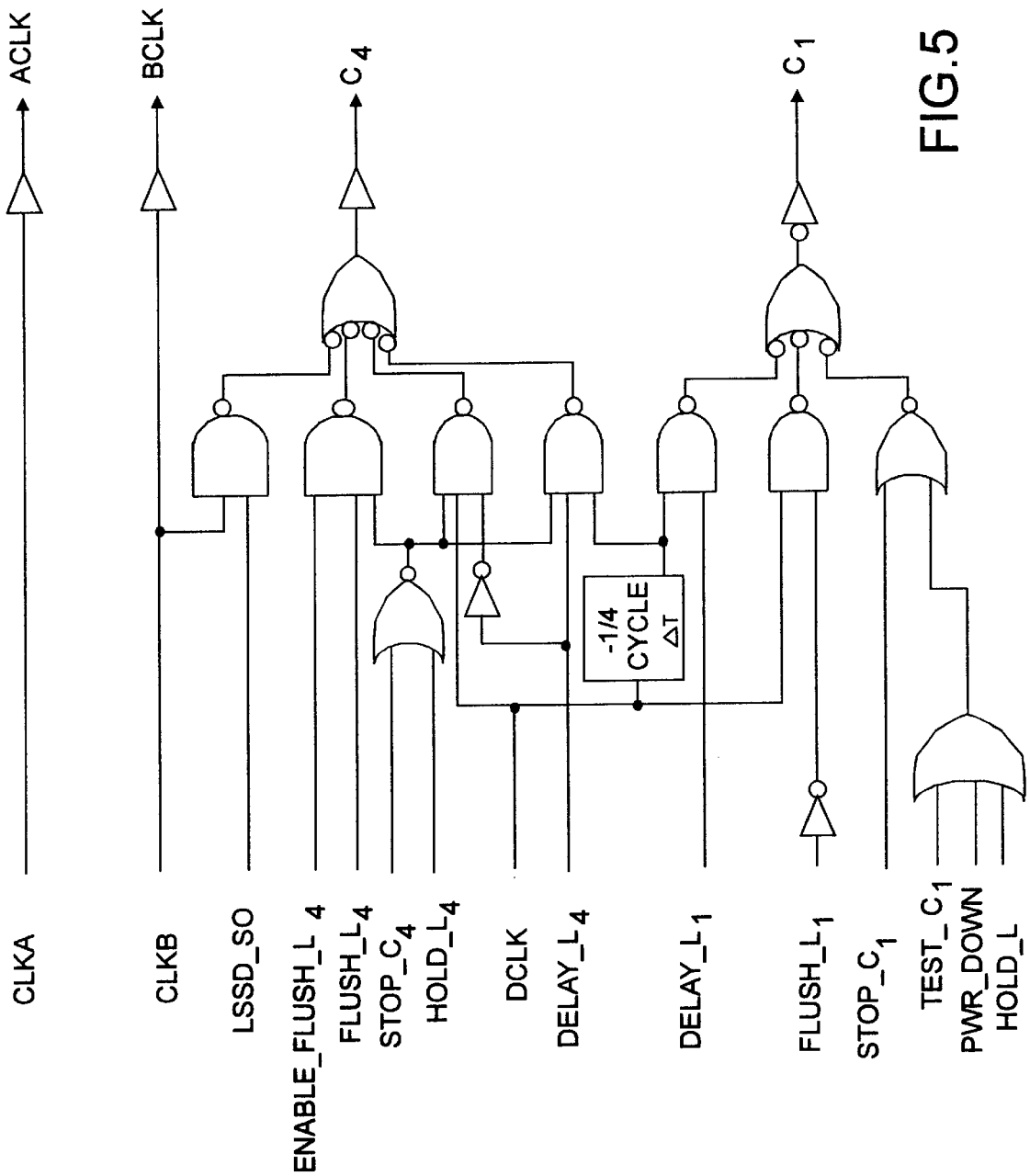
FIG. 5 is a schematic diagram of a clock generation circuit in accordance with the present invention.

Referring now to FIG. 5, and to Table 2, clock signal generation logic in accordance with the present invention will be described.

FIG. 5 shows a clock generation circuit which can be used to generate bus clocks with required quarter cycle, half cycle and three-quarters cycle skews without a requirement for distributing separate clocks on an integrated circuit chip. The circuit in FIG. 5 uses the same signals which are employed on the processor chip for functional operation and test. These signals are CLKA, CLKB, Test_C1, Stop_C1, Stop_C4 and DCLK. The clock generator circuit 50 of FIG. 5 further incorporates signals for flushing (Flush_L4_EN, the Flush_L4 enable signal, Flush_L4 and Flush_L1). Each of the input signals to clock generation circuit 50 is described in detail in Table 2.

TABLE 2

| Signal Name | I/O | Description |
|---|---|---|
| Stop_C4 | Input | Signal used to force the $C_4$ clock off during scanning, regardless inputs other than the BCLK enabled via LSSD_SO_EN. |
| Hold_L4 | Input | Signal used to force the $C_4$ clock off, keeping the $L_4$ contents unchanged. |
| Flush_L4 | Input | Signal to force the $C_4$ clock on, putting the $L_4$ in a flush or transparent mode. This thereby allows changes in the $L_1$ latch, which begin on the falling edge of the DClk, to be visible on the $L_4$ output, giving the effect of an $L_4$ output that changes on the falling edge of the DClk instead of the rising edge of DClk. For testability, this signal must be controlled off by a Flush Enable signal or primary input flagged with a "-SC" flag, which, when off, keeps Flush_L4 from being asserted. |
| Delay_L4 | Input | Signal to delay the assertion and de-assertion of $C_4$ by approximately one nanosecond, or at normal processor speeds, approximately one quarter of a processor cycle. This delay thereby delays the effective sample point of the $L_1/L_4$ latch pair to three-quarters cycle after the rising edge of the DClk. Flush_L1 must be asserted with Delay_L4 for the $C_4$ delay to occur. If Delay_L1 is also asserted, the one-quarter cycle delay is achieved. |
| DClk | Input | The processor clock, generated by the Phase-Locked Loop or module primary inputs. In normal operation this generates the C2 or C4 clocks, and its inversion generates the C1 clocks. Typically this clock runs at 200 to 250 MHz |
| $C_4$ | Output | System L4 clock. This clock usually is a re-drive of the positive phase of the DClk input, but can be forced on by the Flush_L4 signal when enabled, or forced OFF by either the Stop_L4 test signal or Hold_L4 functional signal. The Stop_L4 and Hold_L4 signals dominate over the DClk and Flush_L4 signals in forcing the C4 off |
| Flush_L1 | Input | Signal to force the $C_1$ clock on, putting the $L_1$ in a flush or transparent mode. This thereby allows latch input data to be flushed through to the $L_4$ and be held in the $L_4$ when the $C_4$ clock turns off, giving the effect of capturing data in the latch of the falling edge of the DClk instead of the rising edge of DClk. |
| Delay_L1 | Input | Signal used to delay the assertion and de-assertion |

TABLE 2-continued

| Signal Name | I/O | Description |
|---|---|---|
| | | of $C_1$ by approximately one nanosecond, or at normal processor speeds, approximately one quarter of a processor cycle. This delay thereby delays the effective sample point of the $L_1/L_4$ latch pair to one quarter cycle after the rising edge of the DClk. Flush__$L_1$ must be asserted with Delay__$L_1$ for the $C_1$ delay to occur. |
| Stop__$C_1$ | Input | Signal used to force the $C_1$ clock off-used during scanning and when freezing the state of the processor. This signal may have critical timing problems and therefore has a shorter path into the $C_1$ logic than the Test__$C_1$, Pwr__Down, and Hold__$L_1$ signals. |
| Test__$C_1$ | Input | LSSD test primary input signal used to keep the $C_1$ clock off during LSSD scanning |
| Hold__$L_1$ | Input | Functional signal used to keep the $C_1$ clockoff to hold the contents of the $L_1$ latch constant over multiple processor cycles. This can also be used to power-down the latch. |
| $C_1$ | Output | System $L_1$ clock. This clock is usually a re-drive of the inverted phase of the DClk input, but can be forced on by the Flush__$L_1$ signal, or delayed by 1 nS by the Delay__$L_1$ signal. $C_1$ can be forced OFF by either the Stop__$C_1$, Test__$C_1$ Pwr__Down, or Hold__$L_1$ signals. These signals dominate over the Flush__$L_1$, inverted DClk, and Delay__$L_1$ in forcing $C_1$ off. |

Figure 6:
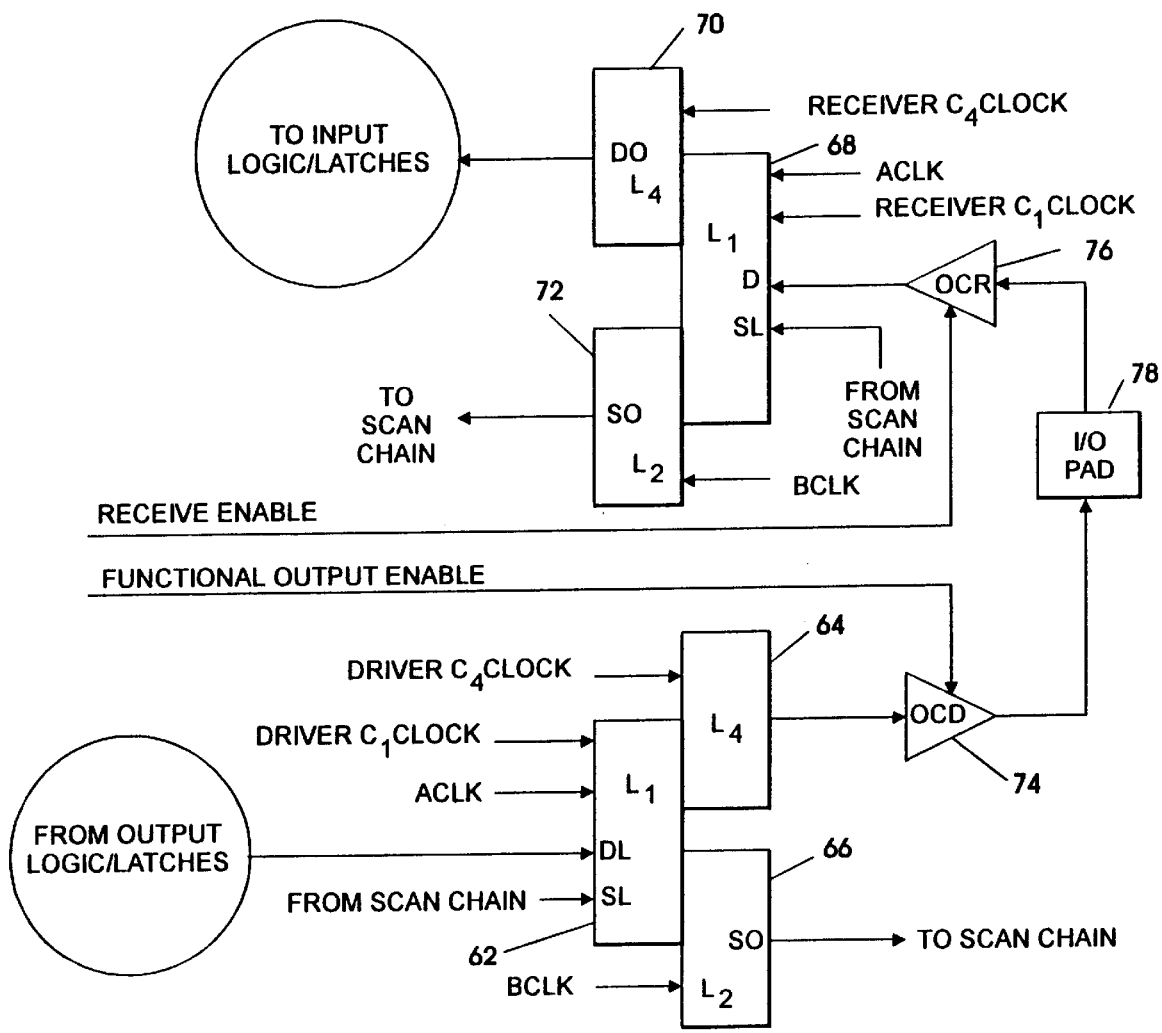
FIG. 6 is a logic diagram showing the logic for clocking input and output data to and from a processor integrated circuit.

Referring now to FIG. 6, the use of the clock generation circuit 50 in accordance with the present invention will be discussed.

FIG. 6 shows how the clock generation systems in accordance with the present invention is used in a boundary scan latch configuration. The outbound latches 62, 64 and 66 are clocked by driver clocks C1 and C4 and the BCLK signal, whereas the inbound latches 68, 70 and 72 are clocked by receiver clocks C1 and C4 and the ACLK signal.

Off chip driver circuits 74 provide outputs from output latches 64 to input-output connections 78 under the control of an output enable signal. Off chip receiver circuits 76 provide inputs to input latch 68 from I/O connections 78 under the control of a receive enable signal.

Figure 7:
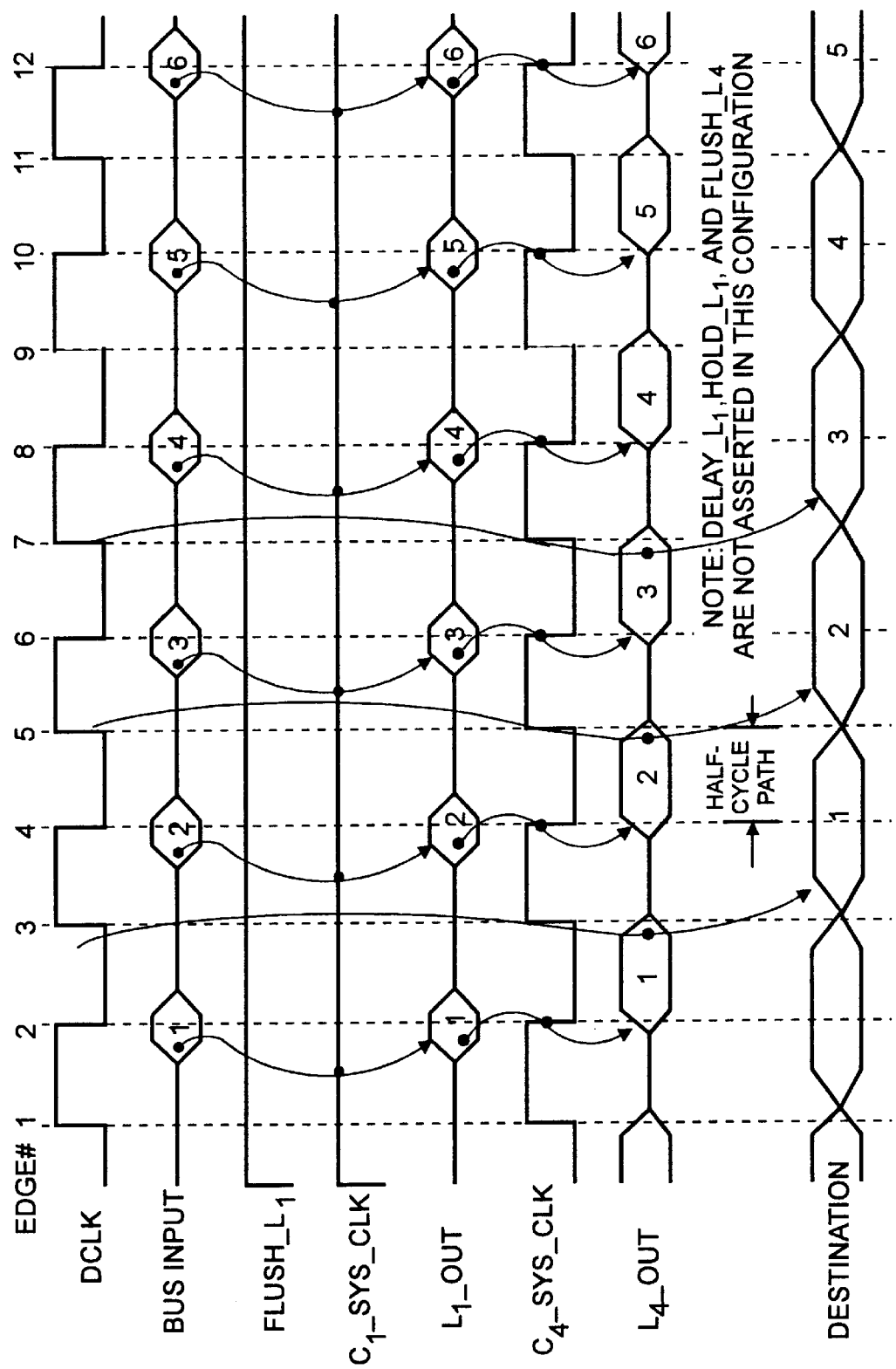
FIG. 7 is a timing diagram showing an input clocking technique having a clock speed ratio of one to one with input sampling skewed one-half clock cycle.

FIG. 7 is a timing diagram showing how the clock generator circuit in accordance with the present invention operates where the data sampling point is skewed by ½ clock cycle such that input data is latched on the falling edge of the DCLK signal.

In such case, latch 68 is placed in a flush mode by asserting the Flush__L1 signal which causes input data to be flushed through to the latch 70. Latch 70 which is clocked normally using the DCLK signal has outputs which are in transition when the receiver C4 clock signal is on, but are stable when the receiver C4 clock signal is off, with whatever data on the input of the latch on the falling edge of the C4 clock being stored in the latch for that half cycle of the processor clock. The output of the latch 70 then has a minimum of one-half clock cycle to reach its destination latch within the logic on the chip.

Figure 8:
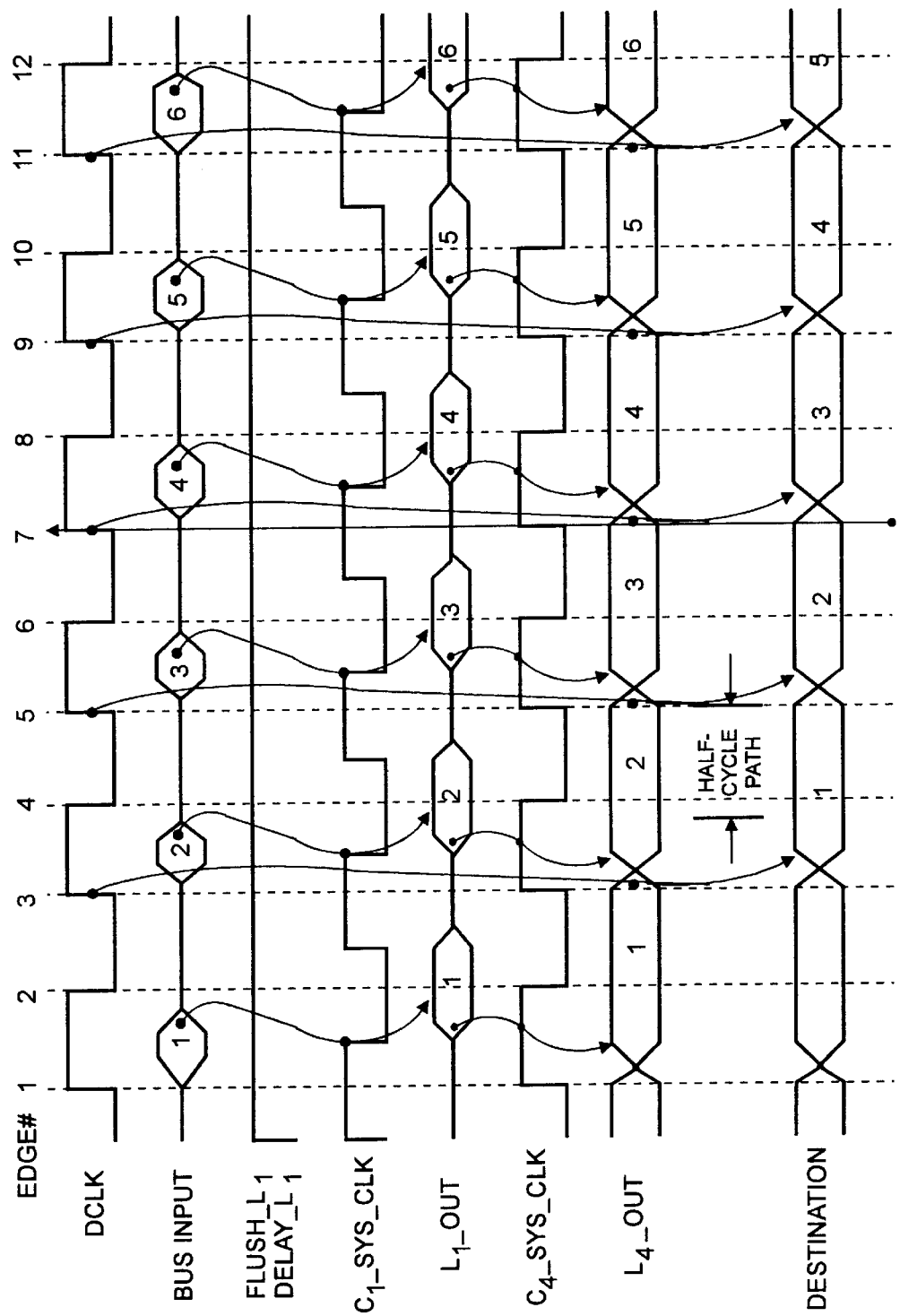
FIG. 8 is a timing diagram of an input clocking technique having a one to one clock speed ratio with input sampling skewed one-quarter clock cycle.

FIG. 8, shows how the clock generated circuit in accordance with the present invention is used for input clocking when the sample point is skewed by approximately one-quarter cycle delay. In this configuration, the Flush__L1 and Delay__L1 signals are both asserted generating a delayed C1 clock signal. The delayed C1 clock signal in turn delays the effective sampling point to the falling edge of the delayed C1 clock and the output of latch 68 is clocked into latch 70 with an unskewed C4 clock signal. The output of latch 70 is therefore stable for approximately ¾ of the processor clock. Allowing the latched data to be forwarded to a destination latch.

Figure 9:
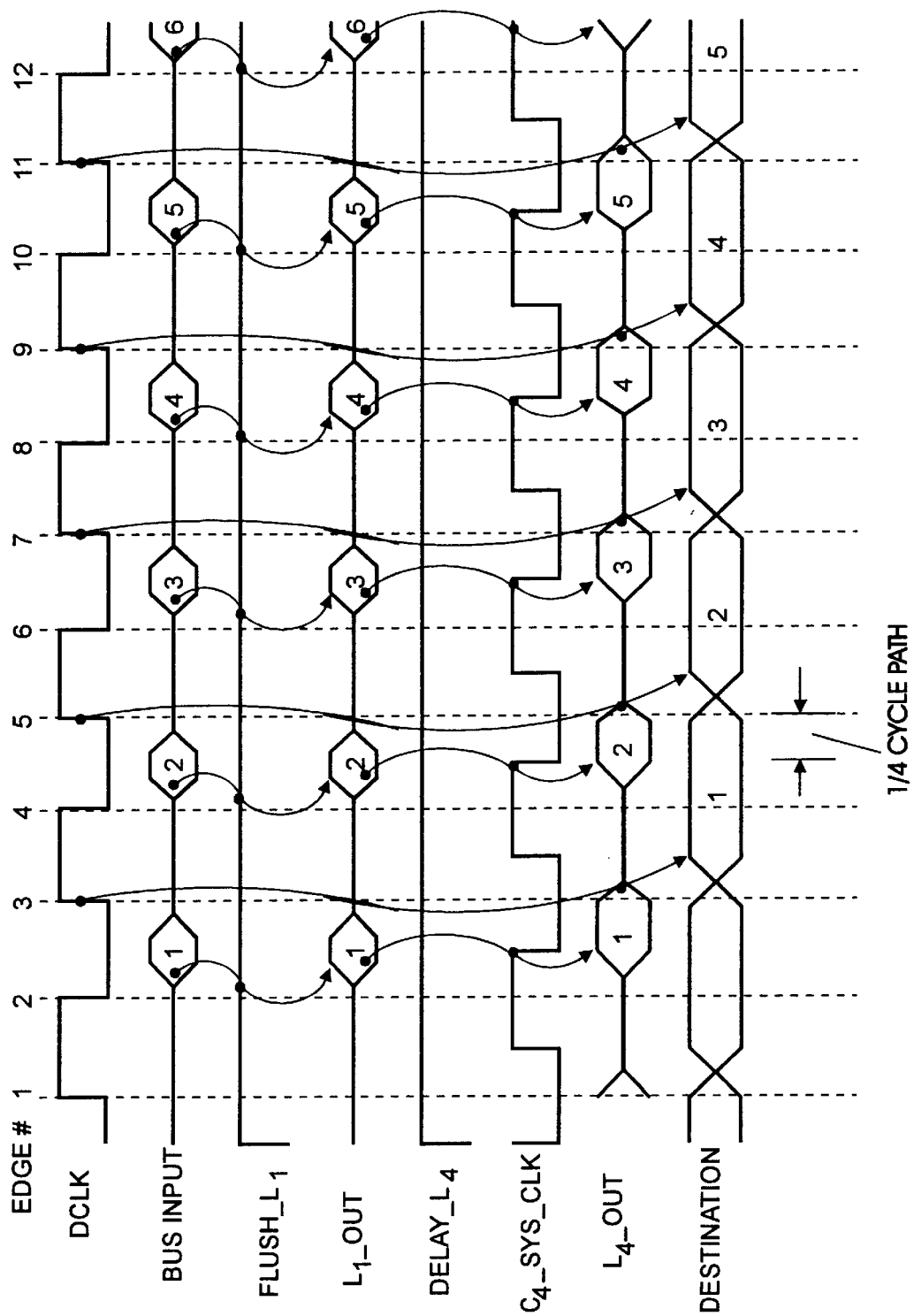
FIG. 9 is a timing diagram of an input clocking technique having a clock speed ratio of one to one with input sampling skewed three-quarters of a clock cycle.

Referring now to FIG. 9, the operation of the clock generator according to present invention for input clocking with a sample point being skewed by ¾ of a clock cycle is shown. In this configuration, the Flush__L1 and Delay__L4 signals are asserted, placing latch 68 in flush mode and delaying the C4 system clock by approximately ¼ clock cycle. Latch 70 is sampling data from the input bus, latching the data when the C4 clock goes negative, giving latch data that is valid for at least one-quarter of a processor clock cycle. If the data is valid and stable on the bus earlier than the sample point, that data is flushed through to the output of latch 70.

Figure 10:
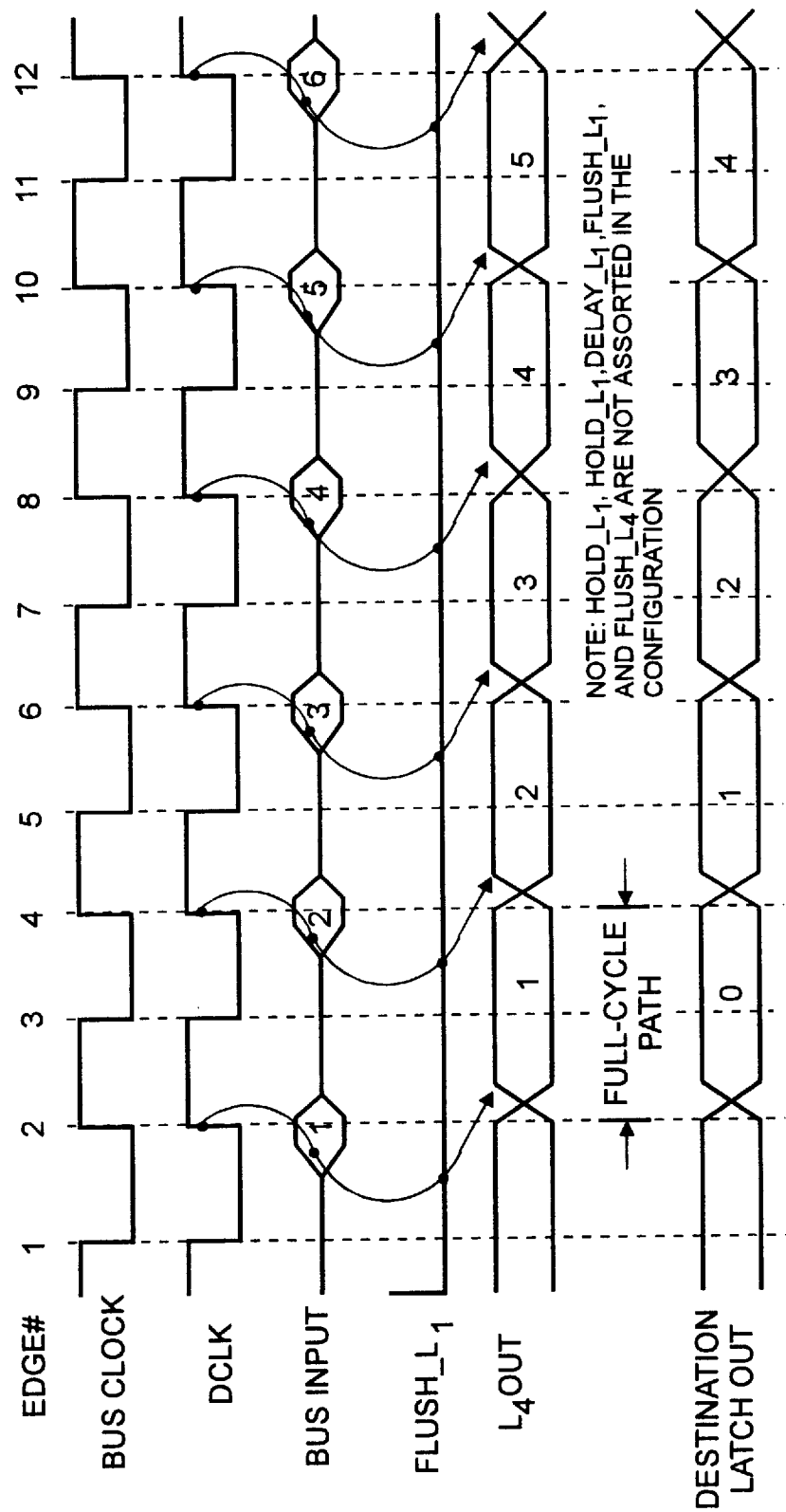
FIG. 10 is a timing diagram of an input clocking technique having a clock speed ratio of one to one without any skew on the bus clock signal.

Referring now to FIG. 10, the normal clocking mode is shown in which the bus input is sampled at the rising edge of the receiver C1 clock signal. In this case, the Flush__L1 signal is not asserted and latch 68, in conjunction with latch 70 operates as a normal latch pair. This allows a full cycle for output data from latch 70 to propagate to the destination latch.

Referring now the FIG. 11, fractional speed ratio input clocking modes will be described.

Figure 11:
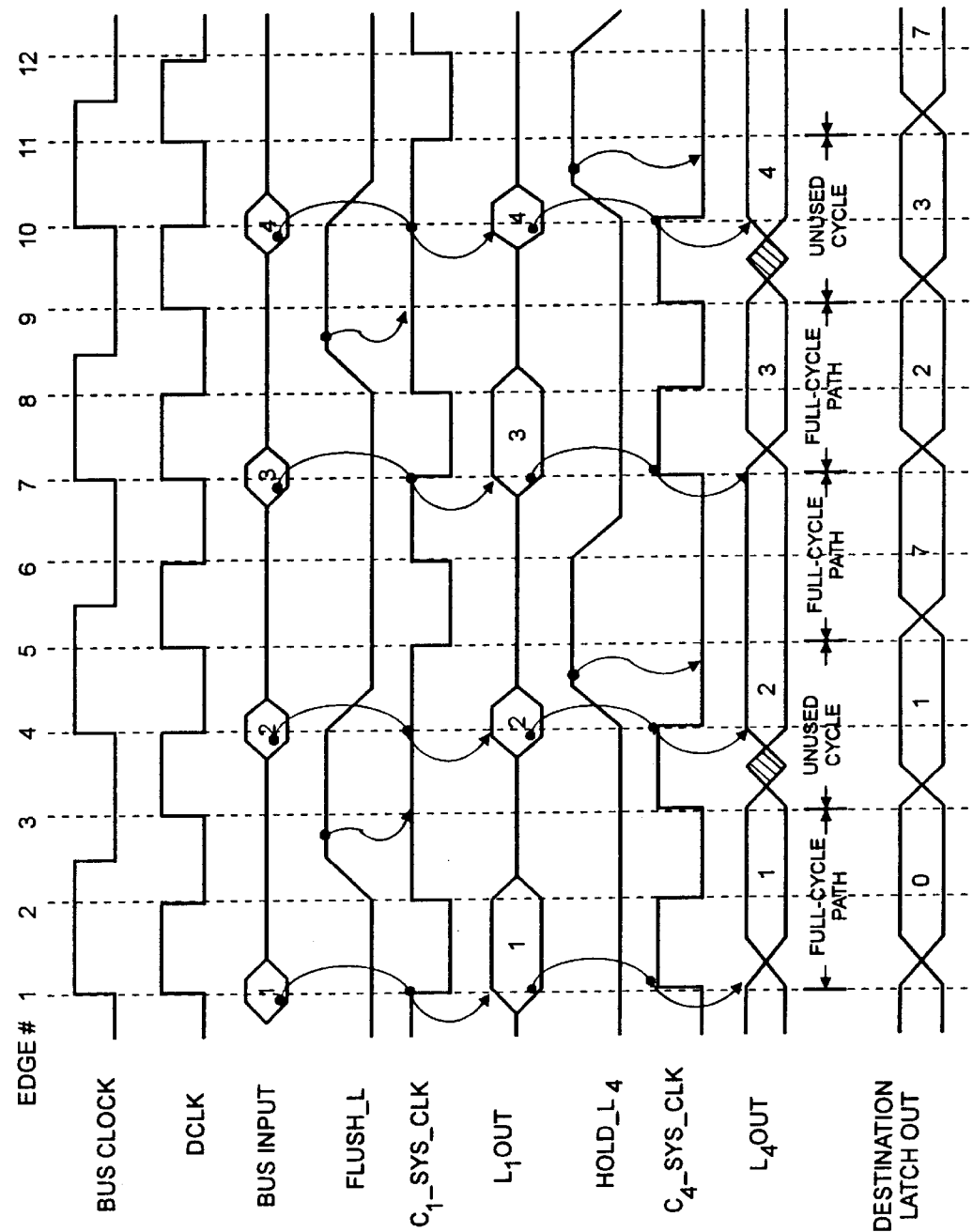
FIG. 11 is a timing diagram of an input clocking technique with a three to two clock speed ratio including flush and hold latch functions.

FIG. 11 shows input clocking for a 3 to 2 processor to bus clock speed ratio. In this situation, the bus clocks rising edge occurs every 1.5 processor clocks. Therefore, on alternate bus cycles the data is clocked on either a rising or a falling edge. Data is clocked on the rising edge of the DCLK signal on the rising edges of the bus clock at edges 1 and 7 and data is clocked on the falling edge of the DCLK signal on the rising edge of the bus clock at edges 4 and 10. To accomplish this result, the Flush__L1 signal and the Hold__L4 signal are switched as shown in FIG. 11.

For the rising edge latching case (edges 1 and 7), the Flush__L1 and Hold__L4 signals are not asserted and latch pair 68, 70 operates a normally clocked latch. This gives a full cycle for the output of latch 70 to be forwarded to the destination latch in the processor.

For the falling edge latching case (edges 4 and 10), the Flush__L1 signal is asserted between clock edges 2 and 4 and between clock edges 8 and 10. This places latch 68 in the flush mode such that the bus input data is effectively sampled and held at the falling edge of the C4 clock (edges 4 and 10). The data is then stable for ½ clock cycle between edge 4 and 5 and between edge 10 and 11. To avoid critical paths during this half cycle, the data is held in latch 70 an extra cycle by asserting the Hold__L4 signal between edges 4 and 6 and between edges 10 and 12. This gives the next full processor cycle (between edges 5 and 7 and between edges 11 and 13) before input data is forwarded to the destination latches.

Figure 12:
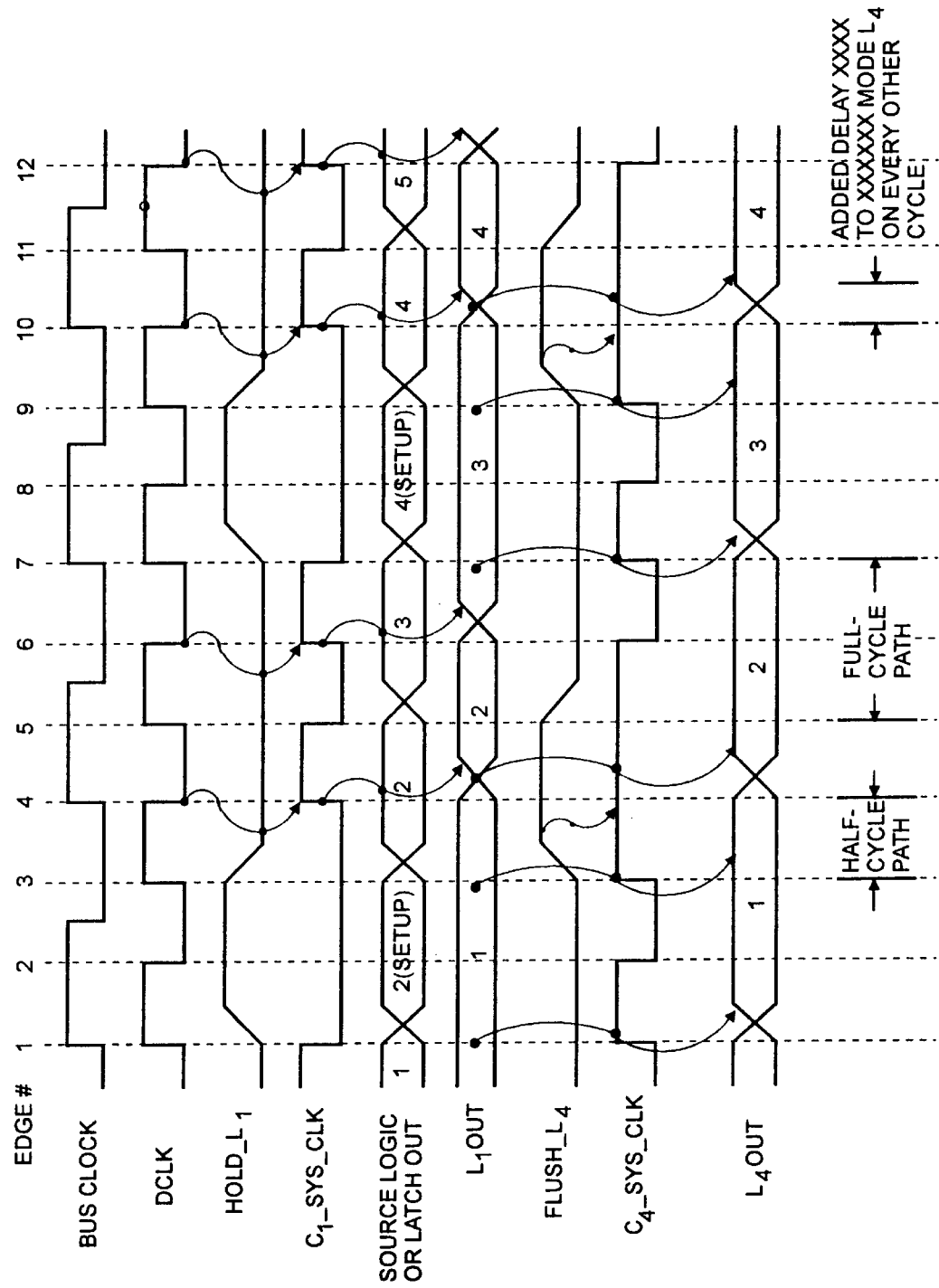
FIG. 12 is a timing diagram of an output clocking technique wherein the clock speed ratio is three to two.

Referring now to FIG. 12, output clocking is shown for a processor to bus clocking ratio of 3 to 2. As with the 3 to 2 ratio input clocking, the bus clock rising edge occurs every 1.5 processor clock rising edges and therefore data is changing on the bus at the same rate. Data is clocked out of latch 64 to the bus starting either on a rising DCLK signal edge (edges 1 and 7)or on a falling DCLK signal (edges 4 and 10). The Hold__L1 and the Flush__L4 signal are used together in the clock generator according to the present invention to control clocking of data.

For the rising edge latching case (edges 1 and 7), the Hold__L1 and Flush__L4 signals are not asserted and rights pair 62, 64 operates as a normally clocked latched pair. To maintain data stability in latch 64 for three clock cycles, the Hold_L1 signal is asserted between edges 1 and 3 and between edges 7 and 9. This keeps the output of latch 62 from changing until edges 4 and 10.

For the falling edge latching case (edges 4 and 10), the Flush_L4 signal is asserted between edges 3 and 5 and between edges 9 and 11. This allows the output data to flush from the source logic or latch through latches 62 and 64 starting at the rising edge of the C1 clock (edge 4 and edge 10).

The clock generator according to the present invention provides flexible clocking ratios as between input buses, output buses and processor clocks with a simple circuit and without the requirement for distributing different clocks across a processor integrated circuit.

Although the present invention and its advantages have been described in detail, it should be understood that various changes, substitutions and alterations can be made herein without departing from the spirit or scope of the invention as defined in the appended claims.

What is claimed is:

1. An information handling system comprising:
   a processor operating at a processor clock speed having a first frequency;
   a common bus coupled to and communicating with the processor, wherein the common bus operates at a common bus clock speed having a second frequency synchronized to the first frequency and a ratio of the first frequency to the second frequency is n/2, where n is an integer greater than or equal to 2; and
   a clock signal generating circuit for generating data sampling signals such that a processor clock signal is propagated throughout the processor operating at the processor clock speed and a common bus clock signal operating at the common bus clock speed is not propagated throughout the processor.

2. The information handling system of claim 1, wherein the processor operating at the processor clock speed further comprises:
   input latches and output latches for communicating with the common bus, each input latch and each output latch comprising a master (L1) latch clocked by a C1 clock and a slave (L4) latch clocked by a C4 clock, wherein each master latch and each slave latch is a level-sensitive, transparent latch, wherein the clock signal generating circuit generates the C1 clock and the C4 clock.

3. The information handling system of claim 2, wherein the clock signal generating circuit has as functional inputs:
   (a) a DCLK signal which is the processor clock speed having a first frequency;
   (b) a HOLD_L4 signal which, when asserted, keeps the C4 clock turned off, and when not asserted, allows the C4 clock to be asserted if the DCLK is asserted;
   (c) a FLUSH_L4 signal which, when asserted, keeps the C4 clock turned on if the HOLD_L4 signal is not asserted;
   (d) a HOLD_L1 signal which, if asserted, will keep the C1 clock turned off, and if not asserted, allows the C1 clock to be asserted if the DCLK is asserted;
   (e) a FLUSH_L1 signal which, when asserted, keeps the C1 clock turned on if the HOLD_L1 signal and DELAY_L1 signal are not asserted;
   (f) a delay element which delays the DCLK nominally ¼ the period of the DCLK;
   (g) a DELAY_L4 signal which, when asserted, delays the C4 clock assertion by a nominal ¼ DCLK cycle by selecting the delayed DCLK from the delay element instead of the undelayed DCLK; and
   (h) a DELAY_L1 signal which, when asserted when FLUSH_L1 is asserted, delays the C1 clock assertion by a nominal ¼ DCLK cycle by selecting the delayed DCLK from the delay element instead of the undelayed DCLK.

4. The information handling system of claim 3, wherein if the ratio of the first frequency to the second frequency is an integer, then the HOLD_L1 signal is asserted for all DCLK periods except the DCLK period immediately before a controlling edge of the common bus clock signal, such that loading of bus input or output signals from the processor operating at the processor clock speed occurs in reference to the controlling edge of the common bus clock signal only.

5. The information handling system of claim 3, wherein if the ratio of the first frequency to the second frequency is not an integer and if a rising (controlling) edge of the common bus clock signal corresponds with a rising edge of the processor clock signal in every other cycle of the common bus clock signal and with a falling edge of the processor clock signal on other common bus clock signal cycles, then the HOLD_L1 signal is asserted except in two cases:
   (1) during a processor clock cycle immediately preceding the rising edge of the common bus clock signal coincident with the rising edge of the processor clock signal, and
   (2) during the processor clock cycle which starts one-half processor clock cycle before the rising edge of the common bus clock signal coincident with the falling edge of the processor clock signal; and
the FLUSH_4 signal is asserted during the processor clock cycle which starts one-half processor clock cycle before the rising edge of the common bus clock signal coincident with the falling edge of the processor clock signal such that C1 and C4 clocks are generated for controlling the output latches which rise and fall in a sequence which generates latch output signals on the common bus which change coincident with the rising edge of the common bus clock signal, without using the common bus clock signal as clocking for the output latches, but only the processor clock signal.

6. The information handling system of claim 3, wherein if the ratio of the first frequency to the second frequency is not an integer and if a rising (controlling) edge of the common bus clock signal corresponds with a rising edge of the processor clock signal in every other cycle of the common bus clock signal and with a falling edge of the processor clock signal on other common bus clock cycles, then the HOLD_L4 signal is asserted except in two cases:
   (1) during a processor clock cycle beginning one-half processor clock cycle before the rising edge of the common bus clock signal coincident with the rising edge of the processor clock signal, and
   (2) during the processor clock cycle which starts one processor clock cycle before the rising edge of the common bus clock signal coincident with the falling edge of the processor clock signal; and
the FLUSH_L1 signal is asserted during a processor clock cycle which starts one processor clock cycle before the rising edge of the common bus clock signal coincident with the falling edge of the processor clock signal such that C1 and C4 clocks are generated for controlling the input latches which rise and fall in a sequence which properly samples data on the common bus coincident with the rising edge of the common bus clock signal, without using the common bus clock signal as clocking for the input latches, but only the processor clock signal.

7. The information handling of claim 3, wherein if the first frequency of the processor clock equals the second frequency of the bus clock, then the FLUSH_L1 and DELAY_L1 signals are asserted such that a falling edge of the C1 clock is delayed and samples of data input from the common bus are delayed approximately ¼ cycle from the rising (controlling) edge of the common bus or chip clock.

8. The information handling of claim 3, wherein if the first frequency of the processor clock equals the second frequency of the bus clock, then the FLUSH_L1 signal is asserted such that a falling edge of the C4 clock is delayed and samples of data input from the common bus are delayed approximately ½ cycle from the rising (controlling) edge of the common bus or processor clock.

9. The information handling of claim 3, wherein if the first frequency of the processor clock equals the second frequency of the bus clock, then the FLUSH_L1 and DELAY_L4 signals are asserted such that a falling edge of the C4 clock is delayed and samples of data input from the common bus are delayed approximately ¾ cycle from the rising (controlling) edge of the common bus or processor clock.

* * * * *